United States Patent [19]

Allen

[11] Patent Number: 5,096,167

[45] Date of Patent: Mar. 17, 1992

[54] SPRING STRUCTURE FOR A THERMIONIC CONVERTER EMITTER SUPPORT ARRANGEMENT

[75] Inventor: Daniel T. Allen, La Jolla, Calif.

[73] Assignee: The United States of America as represented by the United States Department of Energy, Washington, D.C.

[21] Appl. No.: 533,555

[22] Filed: Jun. 5, 1990

Related U.S. Application Data

[62] Division of Ser. No. 480,462, Feb. 15, 1990, Pat. No. 4,963,319, which is a division of Ser. No. 376,071, Jul. 6, 1989, Pat. No. 4,927,599.

[51] Int. Cl.$^5$ .............................................. F16F 1/34
[52] U.S. Cl. ................................................. 267/162
[58] Field of Search ................ 376/321, 463; 267/159, 267/162, 164, 160

[56] References Cited

U.S. PATENT DOCUMENTS 3,394,631  7/1968  Thompson ........................... 267/162

FOREIGN PATENT DOCUMENTS 223591  9/1942  Switzerland ......................... 267/162
857611  1/1961  United Kingdom ................ 267/162

*Primary Examiner*—Daniel D. Wasil
*Attorney, Agent, or Firm*—L. E. Carnahan; Roger S. Gaither; William R. Moser

[57] ABSTRACT

A support is provided for use in a thermionic converter to support an end of an emitter to keep it out of contact with a surrounding collector while allowing the emitter end to move axially as its temperature changes. The emitter end (34) is supported by a spring structure (44) that includes a pair of Belleville springs, and the spring structure is supported by a support structure (42) fixed to the housing that includes the collector. The support structure is in the form of a sandwich with a small metal spring-engaging element (74) at the front end, a larger metal main support (76) at the rear end that is attached to the housing, and with a ceramic layer (80) between them that is bonded by hot isostatic pressing to the metal element and metal main support. The spring structure can include a loose wafer (120) captured between the Belleville springs.

7 Claims, 3 Drawing Sheets

SPRING STRUCTURE FOR A THERMIONIC CONVERTER EMITTER SUPPORT ARRANGEMENT

The Government has rights in this invention pursuant to Contract No. DE-AC03-86SF16298 awarded by the U.S. Department of Energy.

This is a division of application Ser. No. 07/480,462 filed Feb. 15, 1990, now U.S. Pat. No. 4,963,319 issued Oct. 16, 1990, which is a division of application Ser. No. 07/376,071 filed July 6, 1989, now U.S. Pat. No. 4,927,599, issued May 22, 1990.

BACKGROUND OF THE INVENTION

A common type of thermionic converter of a nuclear reactor includes a housing with a hollow collector, and an emitter containing nuclear fuel within the collector. The emitter has one end fixed to the collector and a second or "free" end lying within but out of contact with the collector. The "free" end of the emitter must be supported against sideward movement against the collector while allowing it to move axially as it expands and contracts with changing temperatures. The space between emitter and collector is filled with a cesium plasma in the normal mode of operation of common thermionic converters.

One prior type of support arrangement for the "free" end of the emitter, includes a spring structure formed by a pair of Belleville washers. A forward end of the spring structure lies against the "free" end of the emitter and a opposite rear end lies against a support structure that is supported on the housing. The support structure was formed of ceramic. In tests it was found that as a result of extended exposure to high temperatures, nuclear radiation, and the cesium plasma environment, the ceramic support structure cracked, discolored at its outside edge, and apparently disappeared in the center. These phenomena raise concern over contamination of the space between the emitter and collector by loose ceramic particles, as well as shorting of the cell by the unsupported emitter second end touching the collector. A support arrangement which avoided these problems would be of considerable value.

SUMMARY OF THE INVENTION

In accordance with one embodiment of the present invention, a support arrangement is provided for supporting an end of an emitter that lies within a collector of a thermionic converter, to keep the emitter end away from the collector while allowing the emitter end to move axially with thermal contraction and expansion, which is of high reliability. The support arrangement includes a support structure with a peripheral portion mounted on the housing, and which supports a spring structure that holds the emitter end. The support structure is a sandwich-like structure that includes a metal spring-engaging element, a metal main support whose peripheral portion is mounted on the housing, and a ceramic layer lying between them. The ceramic layer is bonded by hot pressing to the metal element and metal main support. The ceramic layer electrically isolates the spring-supporting element from the main support while providing intimate physical contact with them to provide a good heat transfer path.

The spring structure includes a pair of Belleville-type springs with their peripheries bonded. The holes in the Belleville springs can respectively engage the emitter and the spring-engaging element of the support structure. A wafer can lie loosely within the Belleville springs to minimize the passage of heat by thermal radiation through the Belleville spring assembly.

The novel features of the invention are set forth with particularity in the appended claims. The invention will be best understood from the following description when read in conjunction with the accompanying drawings.

DESCRIPTION OF THE PREFERRED EMBODIMENT

Figure 1:
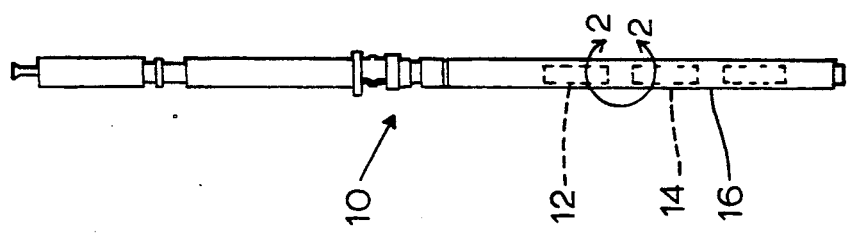
FIG. 1 is a side elevation view of a thermionic nuclear reactor fuel element comprised of three thermionic converters constructed in accordance with the present invention.
Figure 2:
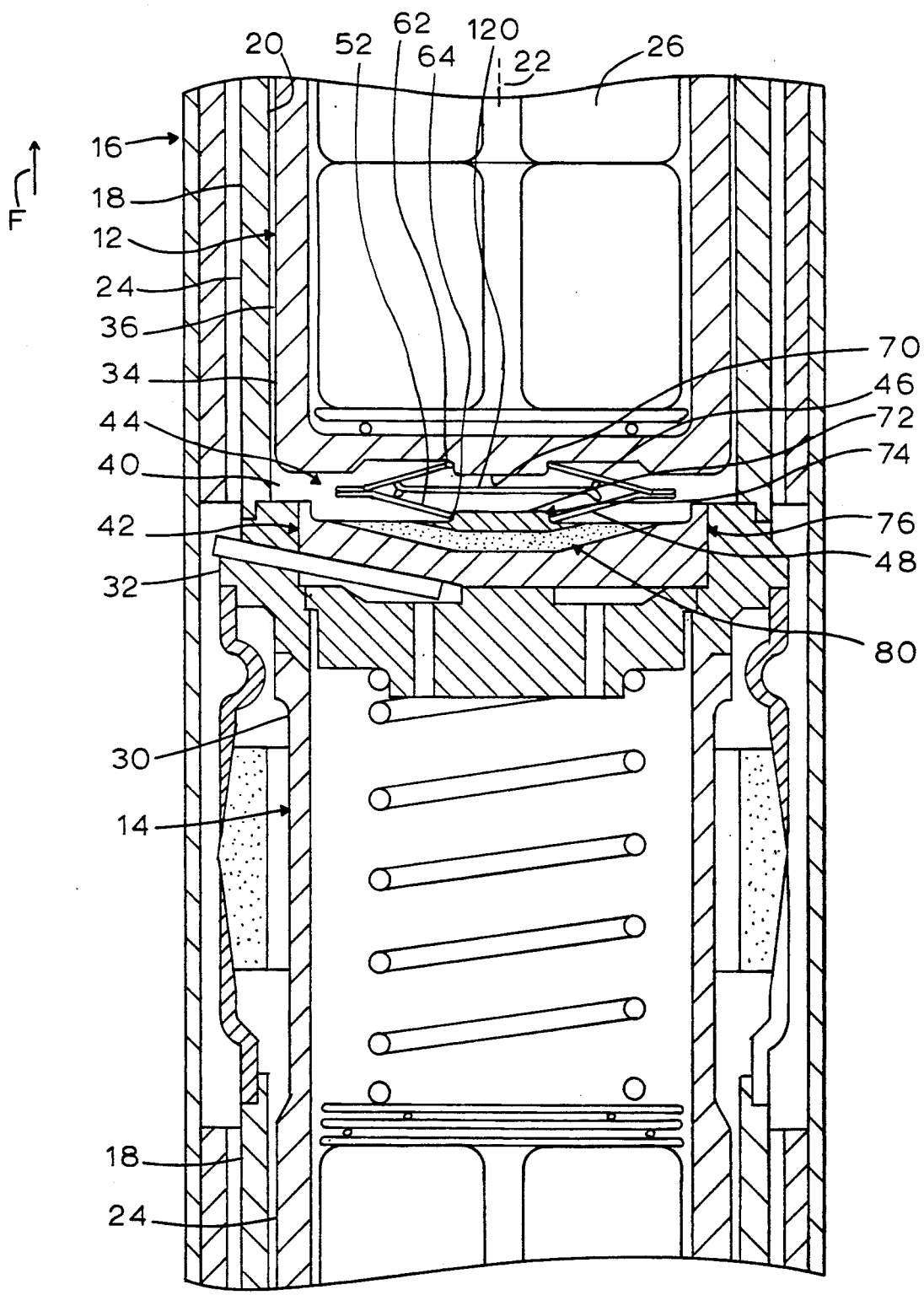
FIG. 2 is a sectional view of the area 2—2 of FIG. 1.

FIG. 1 illustrates a thermionic nuclear reactor fuel element 10 which includes a few thermionic converters such as 12, 14 lying within a housing 16. As shown in FIG. 2, the housing 16 holds within it a three-layer hollow collector 18 with a cylindrical hole 20 lying on an axis 22. The emitter assembly includes an emitter 24 lying concentric with the collector and carrying nuclear reactor fuel 26 in the form of ring-shaped pellets. As is shown for the other thermionic converter 14, the first or "lead" end 30 of each emitter assembly is fixed in position as by a metal transition ring 32 to the housing. The transition ring also serves to electrically connect each converter to the next in electrical series within the thermionic fuel element. The forward or "lead" direction is indicated by arrow F. As shown for emitter assembly 12, each emitter also has a second or rear end 34 that is a free end in that it is not securely fixed to the housing. The free rear end 34 can move axially as the emitter expands and contracts, as it is heated and cooled. An annular space 36 is maintained between the emitter and collector. A support arrangement structure 40 supports the free rear end of the emitter to keep it concentric with the collector and the axis 22 while allowing the free emitter end to move axially by a limited amount.

Figure 3:
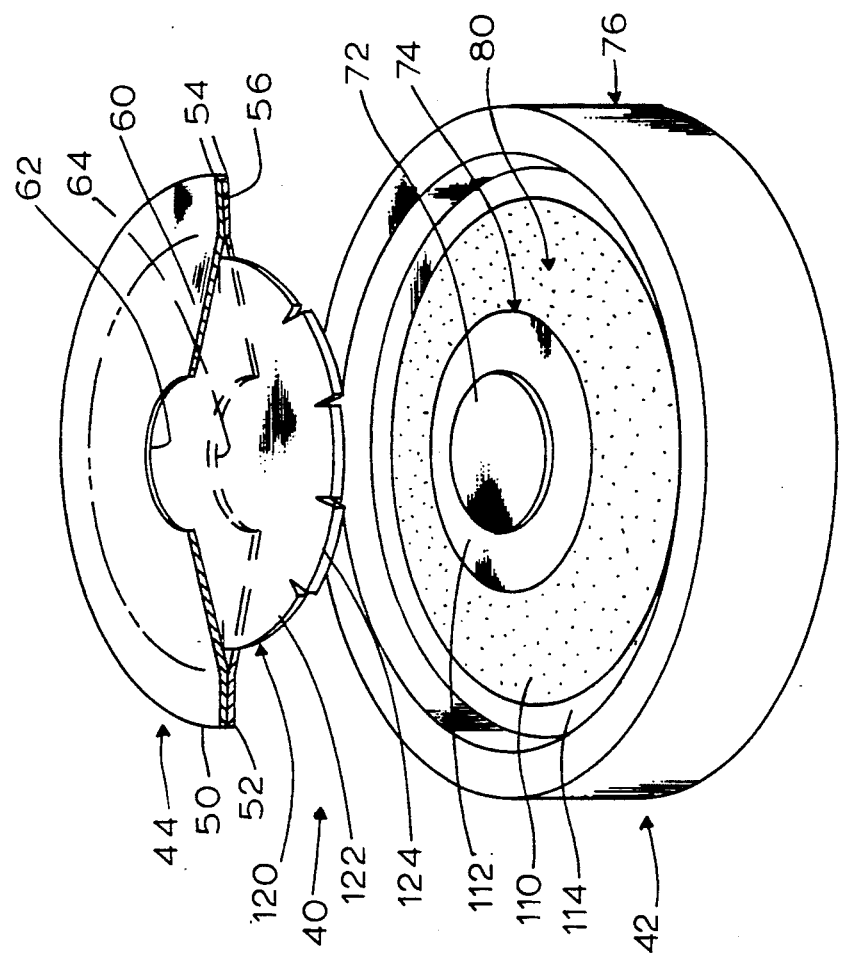
FIG. 3 is an exploded perspective view of the support arrangement of the converter of FIG. 2.

The support arrangement 40 includes a support structure 42 that is mounted on the transition ring 32 of the housing, and a spring structure 44 that has a first or front end 46 that supports the free rear end of the emitter, and a second or rear end 48 that is supported on the support structure 42. As also shown in FIG. 3, the spring structure 44 includes a pair of Belleville-type springs 50, 52 that have adjacent radially outer portions 54 that are joined together as by electron beam welding at 56. The inner portion 60 of each spring has a central hole 62, 64. As shown in FIG. 2, the central holes of the springs engage protrusions 70, 72 on the rear end of the emitter and on the front end of the support structure.

The support structure 42 includes three parts, these being a metal spring-engaging element 74, a metal main support 76, and a ceramic layer 80 between them. The ceramic layer is bonded to the metal parts 74, 76 to not only hold the three parts of the support structure securely together, but also to enable the efficient conduction of heat. Heat is conducted from the spring-engaging element 7 to the main support 76, thence through the transition ring 32 to the collector 18, through the housing 16, and into the reactor coolant which lies outside of the thermionic fuel element. The ceramic layer 80 is electrically insulative to avoid the conduction of electricity between the metal parts 74, 76, which would electrically connect emitter and collector an short-circuit the thermionic converter.

High heat conduction through the bond between the ceramic layer 80 and its support 76 is useful to avoid a high absolute temperature of the ceramic and to avoid a large temperature difference, or large temperature gradient, between opposite surface portions of the ceramic layer and its support that could cause damage to the more fragile ceramic. The Belleville springs of the spring structure 44 are thin and do not easily conduct heat from the emitter end 34 to the spring-engaging element 74 of the support structure. The metal main support 76, whose periphery is joined to the metal ring 32 that is in turn joined to the collector 18, tends to assume a temperature not much above that of the cooler collector 18. Thus, if the ceramic layer 80, which is by nature a heat insulative material, were not thermally bonded to the spring-engaging element 74, the ceramic layer would be at a temperature in between that of the hot emitter 34 and the colder collector. In addition, if there were alternative locations of good and poor conduction between the ceramic layer 80 and its support 76, there would be high temperature gradients through the ceramic and warpage and mechanical damage to the ceramic layer. A higher temperature of the ceramic would also accelerate undesired chemical reaction with its surroundings. The support structure is constructed to provide good bonding between parts at modest cost.

Figure 4:
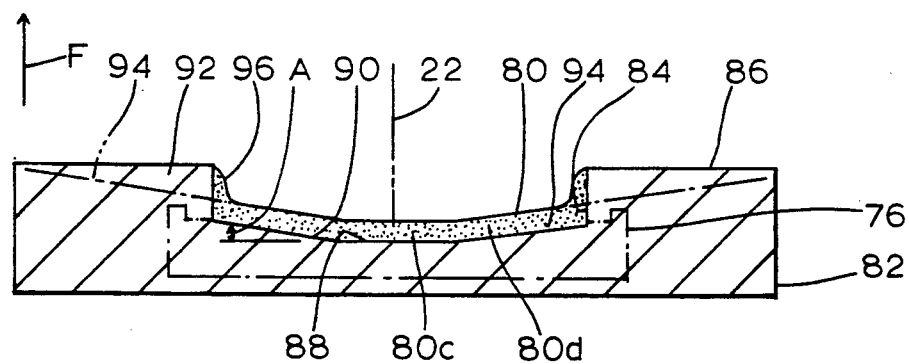
FIG. 4 is a sectional view of apparatus during an early step in the fabrication of the support structure of FIGS. 2 and 3.

FIGS. 4-7 illustrate steps in the fabrication of the support structure 42. As shown in FIG. 4, the fabrication process starts with a lower support element blank 82 out of which the main support element 76 is to be formed. A cavity 84 is formed in the blank and in the to-be-formed main support element thereof, shown in phantom at 76. The cavity is formed in a front face 86 of the blank. A forward direction is indicated by arrow F and the axis of the part is shown at 22. The walls of the cavity 84 are formed so the middle 88 extends radially and an outer portion 9 extends in a forward and radially-outward direction. The outer portion walls 90 extend at an angle A of less than 45° (about 10°) from a direct radially-outward direction. The walls of the cavity are then coated with a plurality of layers, or sublayers, of largely ceramic material such as alumina or yttria forming the ceramic layer at 80. The coating is accomplished by applying (as by plasma spraying) numerous graded sublayers, with a first sublayer consisting of, for example, 50% metal (niobium) and 50% ceramic (alumina or yttria), the next sublayers consisting of 25% metal and 75% ceramic, and the middle sublayers consisting entirely of ceramic. The next-to-last few sublayers consist of 25% metal and 75% ceramic, and the last sublayers consist of 50% metal and 50% ceramic. The use of a combination of metal and ceramic in some sublayers is used to later obtain a cohesive bond between opposite surface portions of the ceramic layer (or group of sublayers) and the metal parts, this process being known. After the entire ceramic layer has been deposited the apparatus has the appearance shown in FIG. 4. The ceramic layer has a radially-extending center portion 80c and a radially-outwardly and forwardly extending outer portion, or cone-shaped portion, 80d.

Figure 5:
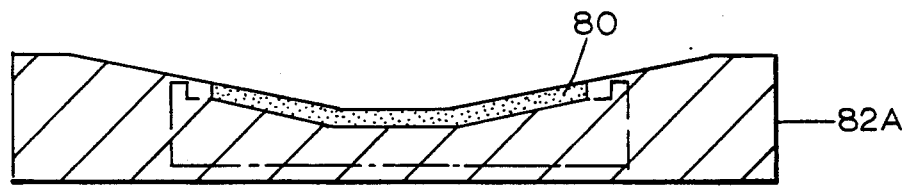
FIG. 5 is a sectional view of the apparatus of FIG. 4 during a later step of the fabrication method.
Figure 6:
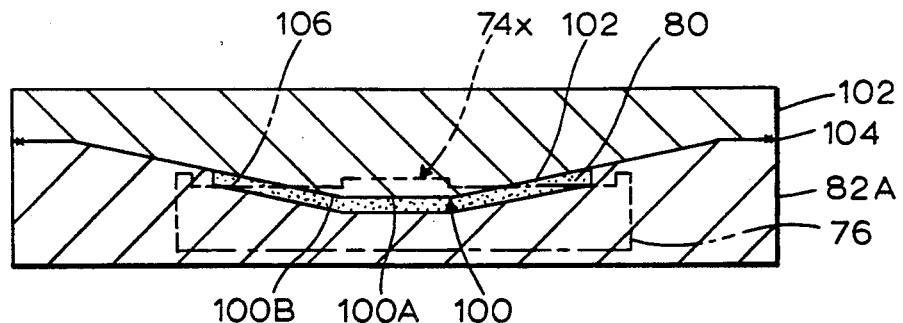
FIG. 6 is a sectional view of the apparatus of FIG. 5 during a later step in the fabrication method.

The next step in the process is to machine away a face portion 92 of the structure of FIG. 4, along the line 94, to remove primarily metal of the blank 92, and to also remove primarily forwardly-extending portions 96 of the ceramic layer and leave primarily radially extending portions. FIG. 5 shows the ceramic layer 80 and the lower blank 82A after such machining. A next step, shown in FIG. 6, is to place an upper element blank 102 (which will form the spring-engaging element, as will be described below) on the forward ceramic face of the layer 80. The upper blank 102 has a rear surface 100 which closely matches the front surface 102 of the ceramic layer. That is, the rear surface 100 has a flat middle region 100a and a cone-shaped outer region 100B, which matches the front faces of the ceramic layer and of the lower blank 82. Then the parts are heated to a high temperature and pressed together in a known HIP (hot isostatic pressing) process which bonds the opposite faces of the ceramic layer 80 to the metal element 74 and the metal blank 82. The fact that adjacent surfaces of all parts lie primarily in parallel planes, facilitates such hot pressing.

Figure 7:
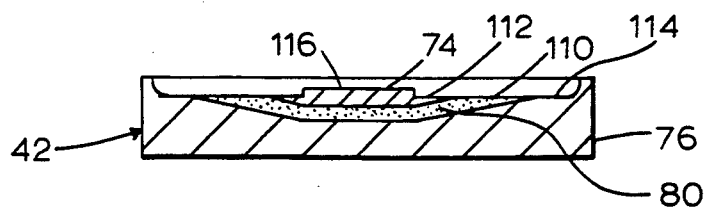
FIG. 7 is a sectional view of the final support structure.

After hot pressing, the periphery of the welded-together upper blank 102 and of the lower blank 82A are machined away. The lower blank 82A is machined to the final desired outer diameter of the main support element 76. Almost all of the upper blank 102 is machined away, with a small portion being left, whose contour is indicated at 74x, and which forms the spring-engaging element 74. Then, the front face of the sandwich formed by the three elements is machined, as by a grinding wheel which grinds away that portion of the ceramic layer 80 lying forward of the line 106. The resultant support structure 42 is shown in FIG. 7. It can be seen that the front face 110 of the ceramic layer is even with adjacent front faces 112 114 of the element 74 and of the main support 76. The front face 112 of element 74 lies around but rearward of the front face 116 of the element protrusion.

After the support structure 42 is formed, it can be attached to the already-formed spring structure 44 (FIG. 2). The walls of the hole 64 in the lower Belleville-type spring can be electron beam welded to the metal spring-engaging element 74 to assure that they are maintained in a predetermined relative position. It may be noted that as the emitter becomes hot and expands, and the spring structure is compressed, the lower Belleville spring 52 begins to flatten against the flat forward face of the support structure.

The operation of the spring structure can be enhanced in some cases by including a wafer 120 (FIG. 3) between the Belleville springs 50, 52. The wafer can be formed of a metal material, and can be formed with edge portions 122, 124 that extend at forward and rearward inclines. The wafer minimizes the passage of heat by thermal radiation from the emitter to the support structure.

Thus, the invention provides a thermionic converter with a support arrangement for supporting the "free" or rearward end of an emitter on the housing in a highly reliable manner. The support arrangement includes a spring structure that holds the free end of the emitter concentric with the collector while allowing the emitter to expand and contract axially, and a support structure that supports the rear end of the spring structure on the housing. The support structure includes a metal spring-engaging member that engages the rear end of the spring structure, a metal main support whose periphery is mounted to the housing, and a ceramic layer between them. The ceramic layer is isostatically hot-press bonded to the rear surface of the spring engaging element and the front surface of the main support, to provide intimate contact for good heat conduction through the support structure, while providing electrical insulation across the ceramic layer. The spring structure can include a pair of Belleville-type springs with adjacent peripheries bonded to each other and axially-spaced inner portions forming central holes. A wafer of larger diameter than either central hole can lie trapped between the Belleville springs to block the passage of heat by thermal radiation through the spring structure.

Although particular embodiments of the invention have been described and illustrated herein, it is recognized that modifications and variations may readily occur to those skilled in the art and consequently it is intended to cover such modifications and equivalents.

What is claimed is:

1. A spring structure that is useful in a thermionic converter to keep and end of an emitter of the converter coaxial with a collector thereof while allowing the emitter end to move axially with respect to a support structure as the emitter thermally expands and contracts, comprising:
    a pair of Belleville-type springs that have adjacent radially outer portions that are joined together, and axially-spaced inner portions that each have a central hole;
    said spring structure includes a wafer that is larger than said central holes, that lies between said Belleville-type springs, and prevents passage between said central holes of said axially-spaced inner portions.

2. The spring structure described in claim 1 wherein said wafer lies loosely between said Belleville-type springs.

3. The spring structure described in claim 1 wherein: said wafer is constructed of material that minimizes the passage of heat by thermal radiation from the emitter to the support structure.

4. A spring structure positioned between two members to keep the members axially aligned while allowing the members to move axially with respect to each other, comprising:
    a pair of Belleville-type springs joined together at adjacent radially outer portions and having axially-spaced inner portions provided with a centrally located openings in each; and
    a wafer-like member located between said pair of Belleville-type springs, said wafer-like member being constructed so as to block passage from one said centrally located openings to the other of said centrally located openings in said pair of Belleville-type springs.

5. The spring structure described in claim 4, wherein said wafer-like member lies loosely between said pair of Belleville-type springs.

6. The spring structure described in claim 4, wherein said wafer-like member is constructed of material that minimizes the passage of heat by thermal radiation through said spring structure.

7. The spring structure described in claim 4, wherein said centrally located openings of said Belleville-type spring are adapted to contact a protruding section on each of said two members for providing alignment thereof.

* * * * *